(12) United States Patent
Ueki et al.

(10) Patent No.: US 11,371,578 B2
(45) Date of Patent: Jun. 28, 2022

(54) VIBRATION DAMPENING DEVICE

(71) Applicant: BRIDGESTONE CORPORATION, Tokyo (JP)

(72) Inventors: Akira Ueki, Tokyo (JP); Yasuyuki Nagashima, Tokyo (JP); Yuki Satake, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 344 days.

(21) Appl. No.: 16/603,999

(22) PCT Filed: Apr. 9, 2018

(86) PCT No.: PCT/JP2018/014887
§ 371 (c)(1),
(2) Date: Oct. 9, 2019

(87) PCT Pub. No.: WO2018/193895
PCT Pub. Date: Oct. 25, 2018

(65) Prior Publication Data
US 2020/0049223 A1 Feb. 13, 2020

(30) Foreign Application Priority Data

Apr. 17, 2017 (JP) .............................. JP2017-081261
May 18, 2017 (JP) .............................. JP2017-098940

(51) Int. Cl.
*F16F 9/34* (2006.01)
*F16F 13/10* (2006.01)
*B60K 5/12* (2006.01)

(52) U.S. Cl.
CPC .............. *F16F 13/10* (2013.01); *B60K 5/12* (2013.01); *F16F 2224/04* (2013.01)

(58) Field of Classification Search
CPC ...................................... F16F 9/10; F16F 9/34
(Continued)

(56) References Cited

U.S. PATENT DOCUMENTS 10,066,695 B2 * 9/2018 Ueki ......................... F16F 9/34
2011/0210488 A1 9/2011 Yamamoto et al.
(Continued)

FOREIGN PATENT DOCUMENTS

CN 105705823 A 6/2016
EP 2 110 576 A2 10/2009
(Continued)

OTHER PUBLICATIONS

Search Report dated Aug. 19, 2020 from the China National Intellectual Property Administration in Application No. 201880024851.6.
(Continued)

*Primary Examiner* — Christopher P Schwartz
(74) *Attorney, Agent, or Firm* — Sughrue Mion, PLLC

(57) ABSTRACT

In a vibration dampening device (10, 110) in an embodiment, a restriction passage (24) includes a first communication portion (26) that is open to a main liquid chamber (14), a second communication portion (27) that is open to an auxiliary liquid chamber (15), and a main body flow path (25) that causes the communication portions to communicate with each other, the first communication portion (26) includes a plurality of pores (31) penetrating a first barrier (28) having a surface (28*a*) facing the main liquid chamber (14), and a protrusion (40, 140) which protrudes toward the main liquid chamber (14) or the auxiliary liquid chamber (15) is formed over an entire circumference of an opening circumferential edge portion of the pore (31) in the surface (28*a*).

14 Claims, 11 Drawing Sheets

(58) Field of Classification Search
USPC ........................................ 267/140.13–140.15
See application file for complete search history.

(56) References Cited

U.S. PATENT DOCUMENTS

| | | |
|---|---|---|
| 2015/0369327 A1 | 12/2015 | Furumachi et al. |
| 2016/0053844 A1* | 2/2016 | Nagasawa ............. F16F 13/106 |
| | | 267/140.13 |
| 2016/0281814 A1 | 9/2016 | Ueki |
| 2017/0023091 A1 | 1/2017 | Ueki |
| 2017/0037924 A1* | 2/2017 | Ueki ....................... F16F 13/10 |
| 2017/0122399 A1 | 5/2017 | Kim |

FOREIGN PATENT DOCUMENTS

| | | |
|---|---|---|
| EP | 3 273 089 A1 | 1/2018 |
| ER | 3 088 766 A1 | 11/2016 |
| JP | 2009-058083 A | 3/2009 |
| JP | 2009-275910 A | 11/2009 |
| JP | 2012-172832 A | 9/2012 |
| JP | 2015-025515 A | 2/2015 |
| JP | 2016-008643 A | 1/2016 |
| JP | 2016-176509 A | 10/2016 |
| KR | 10-1676255 B1 | 11/2016 |
| WO | 2015/163027 A1 | 10/2015 |

OTHER PUBLICATIONS

Extended European Search Report dated Jan. 12, 2021 from the European Patent Office in EP Application No. 18788410.1.
International Search Report for PCT/JP2018/014887, dated Jul. 3, 2018.

* cited by examiner

VIBRATION DAMPENING DEVICE

CROSS REFERENCE TO RELATED APPLICATIONS

This application is a National Stage of International Application No. PCT/JP2018/014887 filed Apr. 9, 2018, claiming priority based on Japanese Patent Application No. 2017-081261, filed on Apr. 17, 2017, and Japanese Patent Application No. 2017-098940, filed on May 18, 2017, the contents of which are incorporated herein by reference.

TECHNICAL FIELD

The present invention relates to a vibration dampening device which is applied to, for example, a vehicle or an industrial machine, and absorbs and attenuates vibration of a vibration generating portion such as an engine.

BACKGROUND ART

As this type of vibration dampening device, in the related art, a liquid-sealed type vibration dampening device which includes a cylindrical first mounting member connected to any one of a vibration generating portion and a vibration receiving portion, a second mounting member connected to the other, an elastic body that elastically connects both the mounting members to each other, and a partition member that partitions a liquid chamber in the first mounting member having a liquid sealed therein into a first liquid chamber and a second liquid chamber and has a restriction passage formed to cause the first liquid chamber and the second liquid chamber to communicate with each other is known.

In this vibration dampening device, when vibration is input, both the mounting members are relatively displaced while elastically deforming the elastic body, and the liquid pressure of at least one of the first liquid chamber and the second liquid chamber is fluctuated to circulate the liquid in the restriction passage, whereby the vibration is absorbed and attenuated.

However, in this vibration dampening device, for example, when the liquid pressure of, for example, the first liquid chamber rises sharply due to an input of a large load (vibration) from uneven portions or a road surface or the like and thereafter a load is input in the reverse direction due to rebounding of the elastic body or the like, a negative pressure is suddenly generated in the first liquid chamber. Then, this suddenly generated negative pressure may cause cavitation in which a large number of bubbles are generated in the liquid, and furthermore, there may be cases where abnormal sound occur due to cavitation collapse in which the generated bubbles collapse.

Therefore, for example, as in a vibration dampening device described in Patent Document 1 below, a configuration in which a valve body is provided in a restriction passage to suppress the generation of a negative pressure in a first liquid chamber even when vibration with a large amplitude is input is known.

CITATION LIST

Patent Document

[Patent Document 1] Japanese Unexamined Patent Application, First Publication No. 2012-172832

DISCLOSURE OF INVENTION

Technical Problem

However, in the vibration dampening device in the related art, the structure becomes complex due to the provision of the valve body, and the valve body also needs to be tuned, so that there is a problem that the manufacturing cost increases. In addition, due to the provision of the valve body, the degree of freedom in design decreases, and as a result, there is a possibility of a reduction in vibration dampening characteristics.

The present invention has been made in view of the above-mentioned circumstances, and an object thereof is to provide a vibration dampening device capable of suppressing the generation of abnormal sound caused by cavitation collapse without reducing vibration dampening characteristics with a simple structure.

Solution to Problem

In order to solve the problems, a vibration dampening device of the present invention is a liquid-sealed type vibration dampening device including: a cylindrical first mounting member connected to any one of a vibration generating portion and a vibration receiving portion, and a second mounting member connected to the other; an elastic body elastically connecting both the mounting members to each other; and a partition member that partitions a liquid chamber in the first mounting member in which a liquid is sealed into a first liquid chamber and a second liquid chamber, in which a restriction passage that causes the first liquid chamber and the second liquid chamber to communicate with each other is formed in the partition member, the restriction passage includes a first communication portion that is open to the first liquid chamber, a second communication portion that is open to the second liquid chamber, and a main body flow path that causes the first communication portion and the second communication portion to communicate with each other, at least one of the first communication portion and the second communication portion includes a plurality of pores penetrating a barrier having a surface facing the first liquid chamber or the second liquid chamber, and a protrusion which protrudes toward the first liquid chamber or the second liquid chamber is formed at an opening circumferential edge portion of at least one pore among the plurality of pores in the surface of the barrier.

Effects of Invention

According to the vibration dampening device described above, it is possible to suppress the generation of abnormal sound caused by cavitation collapse without reducing vibration dampening characteristics with a simple structure.

DESCRIPTION OF EMBODIMENTS

First Embodiment

Hereinafter, an embodiment of a vibration dampening device according to the present invention will be described with reference to the drawings.

Figure 1:
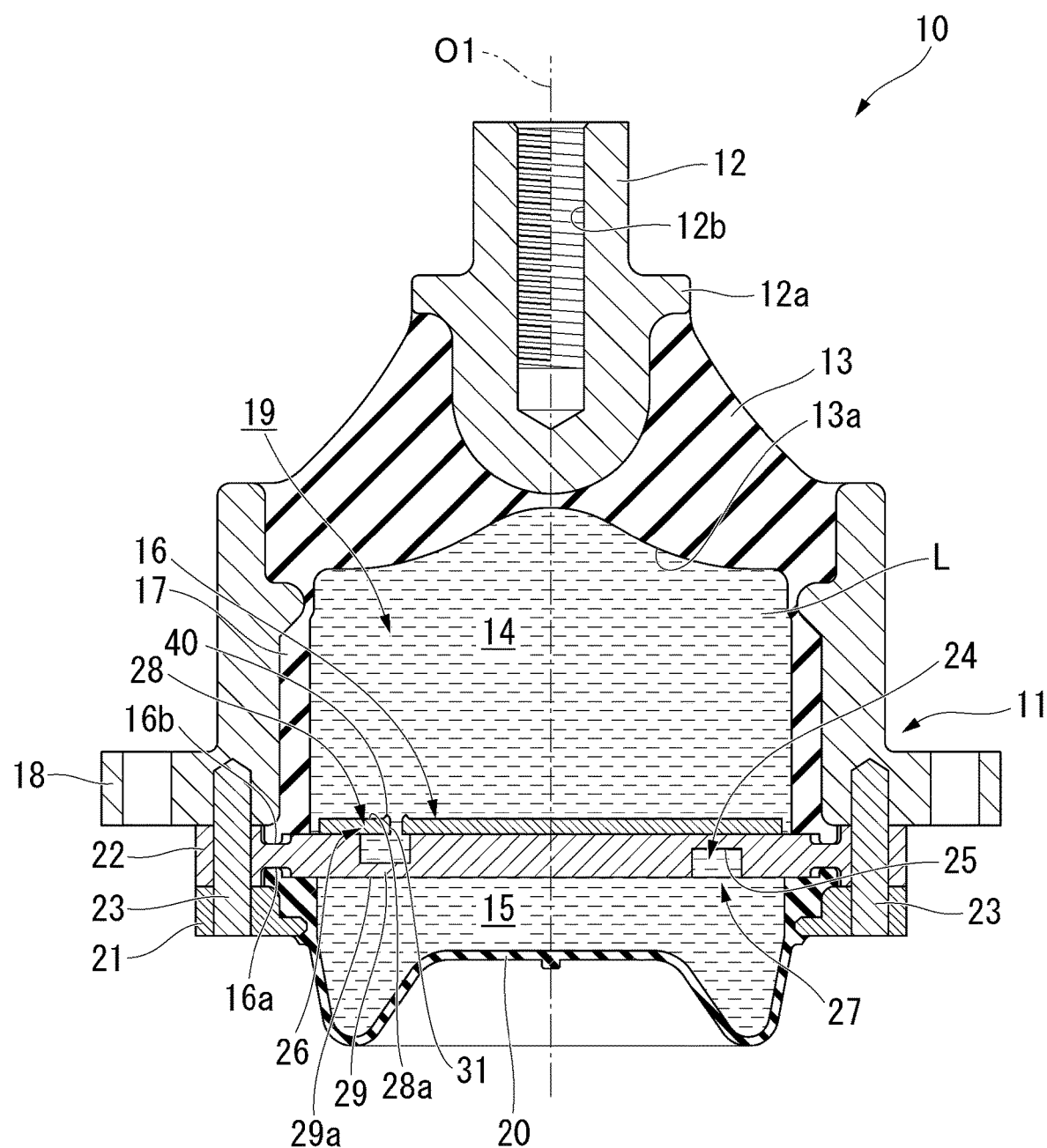
FIG. 1 is a longitudinal sectional view of a vibration dampening device according to a first embodiment of the present invention.

As illustrated in FIG. 1, a vibration dampening device 10 is a liquid-sealed type vibration dampening device including: a cylindrical first mounting member 11 connected to any one of a vibration generating portion and a vibration receiving portion, a second mounting member 12 connected to the other of the vibration generating portion and the vibration receiving portion, an elastic body 13 which elastically connects the first mounting member 11 and the second mounting member 12 to each other, and a partition member 16 which partitions the inside of the first mounting member 11 into a main liquid chamber (first liquid chamber) 14 and an auxiliary liquid chamber (second liquid chamber) 15, which will be described later.

Hereinafter, a direction along a central axis O1 of the first mounting member 11 is referred to as an axial direction (hole axial direction). The second mounting member 12 side along the axial direction is referred to as an upper side, and the partition member 16 side is referred to as a lower side. Furthermore, in a plan view of the vibration dampening device 10 as viewed in the axial direction, a direction orthogonal to the central axis O1 is referred to as a radial direction, and a direction circling around the central axis O1 is referred to as a circumferential direction. A longitudinal section is a section in a section (section including the central axis O1) along the central axis O1 of vibration dampening device 10.

The first mounting member 11, the second mounting member 12, and the elastic body 13 are each formed in a circular shape or an annular shape in a plan view, and are arranged coaxially with the central axis O1.

In a case where the vibration dampening device 10 is mounted on, for example, a vehicle, the second mounting member 12 is connected to the engine as the vibration generating portion, and the first mounting member 11 is connected to the vehicle body as the vibration receiving portion. Accordingly, transmission of vibration of the engine to the vehicle body is suppressed.

The second mounting member 12 is a columnar member extending in the axial direction, has a hemispherical shape protruding downward at the lower end portion, and has a flange portion 12a above the hemispherical lower end portion. The second mounting member 12 is provided with a threaded hole 12b extending downward from the upper end surface thereof, and a bolt (not illustrated) serving as a mounting tool on the engine side is screwed into the threaded hole 12b. The second mounting member 12 is disposed at the upper end opening of the first mounting member 11 via the elastic body 13.

The elastic body 13 is a rubber body which is adhered by vulcanization to each of the upper end opening of the first mounting member 11 and the outer circumferential surface of the lower portion of the second mounting member 12 so as to be interposed therebetween and closes the upper end opening of the first mounting member 11 from the upper side. The elastic body 13 comes in sufficiently close contact with the second mounting member 12 as the upper end portion thereof abuts the flange portion 12a of the second mounting member 12 and reliably follows the displacement of the second mounting member 12. The lower end portion of the elastic body 13 is formed integrally with a rubber film 17 which liquid-tightly covers the inner circumferential surface of the first mounting member 11 and the inner circumferential portion of the lower end opening edge thereof. As the elastic body 13, an elastic body made of a synthetic resin or the like instead of rubber can also be used.

The first mounting member 11 is formed in a cylindrical shape having a flange 18 at the lower end portion, and is connected to the vehicle body or the like as the vibration receiving portion via the flange 18. A portion of the inside of the first mounting member 11 located below the elastic body 13 is a liquid chamber 19. In the present embodiment, the partition member 16 is provided at the lower end portion of the first mounting member 11, and a diaphragm 20 is provided below the partition member 16. The upper surface of an outer circumferential portion 22 of the partition member 16 abuts the lower end opening edge of the first mounting member 11.

The diaphragm 20 is made of an elastic material such as rubber or a soft resin and is formed in a cylindrical shape with a bottom. The upper end portion of the diaphragm 20 is axially sandwiched by the lower surface of the outer circumferential portion 22 of the partition member 16 and a ring-shaped holder 21 located below the partition member 16. The lower end portion of the rubber film 17 liquid-tightly abuts the upper surface of the outer circumferential portion 22 of the partition member 16.

Under such a configuration, the outer circumferential portion 22 of the partition member 16 and the holder 21 are disposed downward in this order at the lower end opening edge of the first mounting member 11 and are fixed thereto integrally by screws 23, so that the diaphragm 20 is mounted to the lower end opening of the first mounting member 11 via the partition member 16. In the illustrated example, the bottom portion of the diaphragm 20 is deep at the outer circumferential side and shallow at the central portion. However, as a shape of the diaphragm 20, various shapes conventionally known can be adopted other than such a shape.

In addition, as the diaphragm 20 is mounted to the first mounting member 11 via the partition member 16 as described above, the liquid chamber 19 is formed in the first mounting member 11 as described above. The liquid chamber 19 is disposed in the first mounting member 11, that is, inside the first mounting member 11 in a plan view, and forms a sealed space liquid-tightly sealed by the elastic body 13 and the diaphragm 20. In addition, a liquid L is sealed (filled) in the liquid chamber 19.

The liquid chamber 19 is partitioned by the partition member 16 into the main liquid chamber 14 and the auxiliary liquid chamber 15. The main liquid chamber 14 is a space that has a lower surface 13a of the elastic body 13 as a portion of the wall surface and is surrounded by the elastic body 13, the rubber film 17 which liquid-tightly covers the inner circumferential surface of the first mounting member 11, and the partition member 16, and the internal volume thereof changes with the deformation of the elastic body 13. The auxiliary liquid chamber 15 is a space surrounded by the diaphragm 20 and the partition member 16, and the internal volume thereof changes with the deformation of the diaphragm 20. The vibration dampening device 10 having such a configuration is a compression type device that is mounted and used so that the main liquid chamber 14 is located on the upper side in the vertical direction and the auxiliary liquid chamber 15 is located on the lower side in the vertical direction.

In the lower surface of the partition member 16 facing the auxiliary liquid chamber 15 side, at a portion adjacent to the outer circumferential portion 22 on the radially inner side, a first holding groove 16a that is recessed upward is formed. As the upper end portion of the diaphragm 20 tightly abuts the first holding groove 16a, the space between the diaphragm 20 and the partition member 16 is closed.

Furthermore, in the upper surface of the partition member 16 facing the main liquid chamber 14 side, at a portion adjacent to the outer circumferential portion 22 on the radially inner side, a second holding groove 16b that is recessed downward is formed. As the lower end portion of the rubber film 17 tightly abuts the second holding groove 16b, the space between the rubber film 17 and the partition member 16 is closed.

Figure 2:
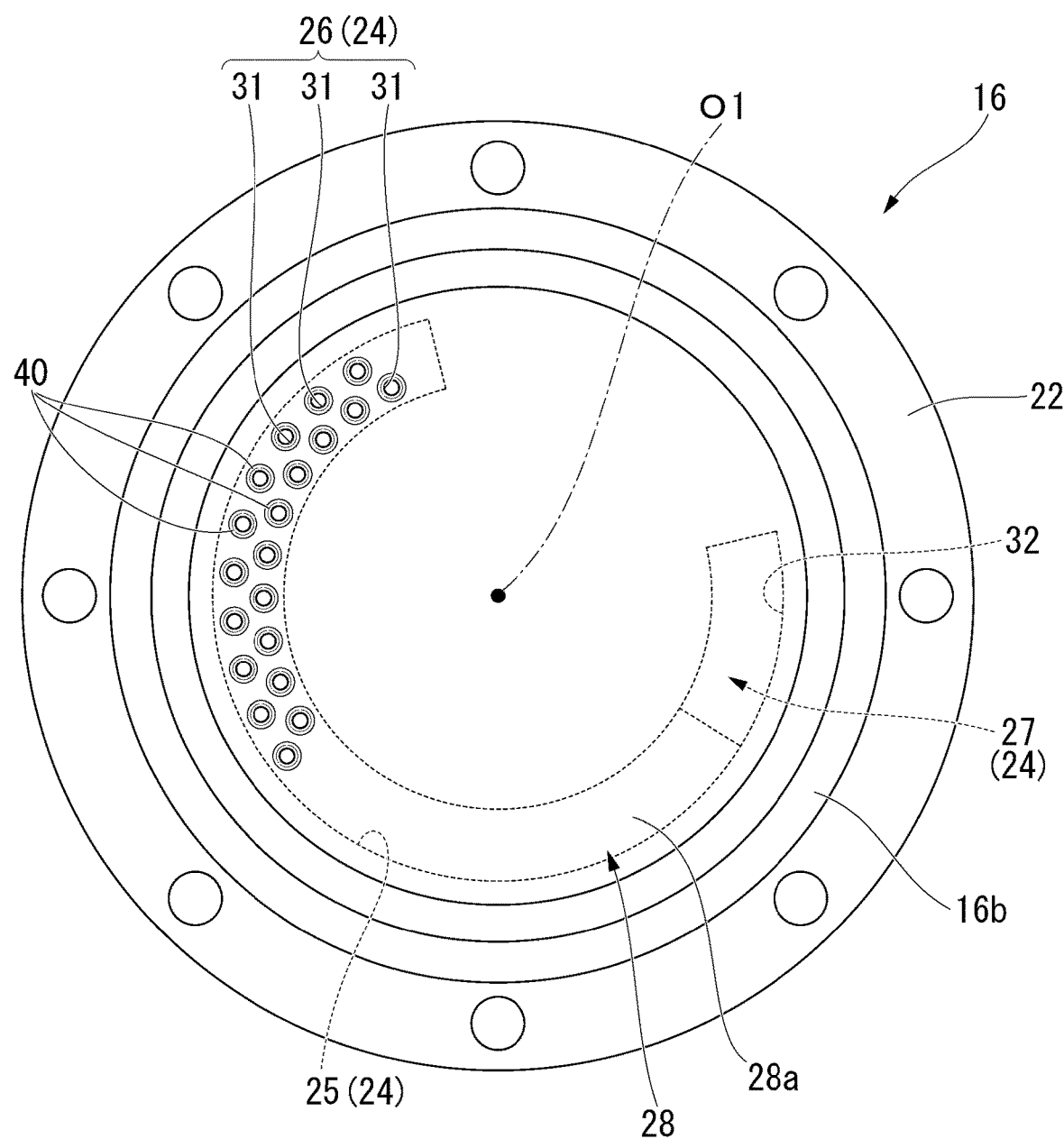
FIG. 2 is a plan view of a partition member of the vibration dampening device illustrated in FIG. 1.

In the partition member 16, a restriction passage 24 that causes the main liquid chamber 14 and the auxiliary liquid chamber 15 to communicate with each other is formed. As illustrated in FIGS. 1 and 2, the restriction passage 24 includes a first communication portion 26 that is open to the main liquid chamber 14, a second communication portion 27 that is open to the auxiliary liquid chamber 15, and a main body flow path 25 that causes the first communication portion 26 and the second communication portion 27 to communicate with each other.

The main body flow path 25 extends along the circumferential direction in the partition member 16, and the flow direction of the main body flow path 25 and the circumferential direction are coincident with each other. The main body flow path 25 is formed in an arc shape arranged coaxially with the central axis O1 and extends over a range in which the central angle centered on the central axis O1 exceeds 180°. The main body flow path 25 is defined by a first barrier 28 facing the main liquid chamber 14 and a second barrier 29 facing the auxiliary liquid chamber 15 in the partition member 16.

Each of the first barrier 28 and the second barrier 29 is formed in a plate shape of which the front and back faces face in the axial direction. The first barrier 28 is axially sandwiched by the main body flow path 25 and the main liquid chamber 14 and is located between the main body flow path 25 and the main liquid chamber 14. The second barrier 29 is axially sandwiched by the main body flow path 25 and the auxiliary liquid chamber 15 and is located between the main body flow path 25 and the auxiliary liquid chamber 15.

The second communication portion 27 includes one opening 32 penetrating the second barrier 29 in the axial direction.

The opening 32 is disposed in a portion of the second barrier 29 that forms one end portion along the circumferential direction of the main body flow path 25.

In the embodiment, the first communication portion 26 includes a plurality of pores 31 that penetrate the first barrier 28 in the axial direction and are arranged along the circumferential direction (the flow path direction of the main body flow path 25). The plurality of pores 31 are disposed in a portion of the first barrier 28 that forms the other end portion along the circumferential direction of the main body flow path 25. At least some of the plurality of pores 31 form a row of holes spaced in the circumferential direction on concentric circles centered on the central axis O1.

Hereinafter, the one end portion side of the main body flow path 25 along the circumferential direction is referred to as one side, and the other end portion side is referred to as the other side. Furthermore, in the plan view, the direction orthogonal to a central axis O2 (see FIG. 3) of the pore 31 is referred to as a hole radial direction, and the direction circling around the central axis O2 is referred to as a hole circumferential direction.

The central axis O2 extends along the axial direction.

Each of the plurality of pores 31 is smaller than the flow path cross-sectional area of the main body flow path 25 and is disposed inside each of the first barrier 28 and the main body flow path 25 in the plan view. In the illustrated example, the lengths of the plurality of pores 31 are equal to one another. The inner diameters of the plurality of pores 31 are equal to one another. The lengths and the inner diameters of the plurality of pores 31 may be made different from each other.

The plurality of pores 31 are formed in the first barrier 28 at intervals in the radial direction. That is, a plurality of hole rows are arranged in the first barrier 28 at intervals in the radial direction. In the illustrated example, two pores 31 are formed in the first barrier 28 at an interval in the radial direction. The pores 31 adjacent to each other in the radial direction are arranged so that the circumferential positions thereof are shifted from each other. The plurality of pores 31 may be arranged in the first barrier 28 at the same positions along the circumferential direction at intervals in the radial direction.

The cross-sectional area of the pore 31 may be, for example, 25 mm 2 or less, and preferably 2 mm 2 or more and 8 nm 2 or less.

The total flow path cross-sectional area of the first communication portion 26 which is the sum of the cross-sectional areas of the plurality of pores 31 for the entire pores 31 may be, for example, 1.8 times or more and 4.0 times or less the minimum value of the flow path cross-sectional area of the main body flow path 25.

Figure 3:
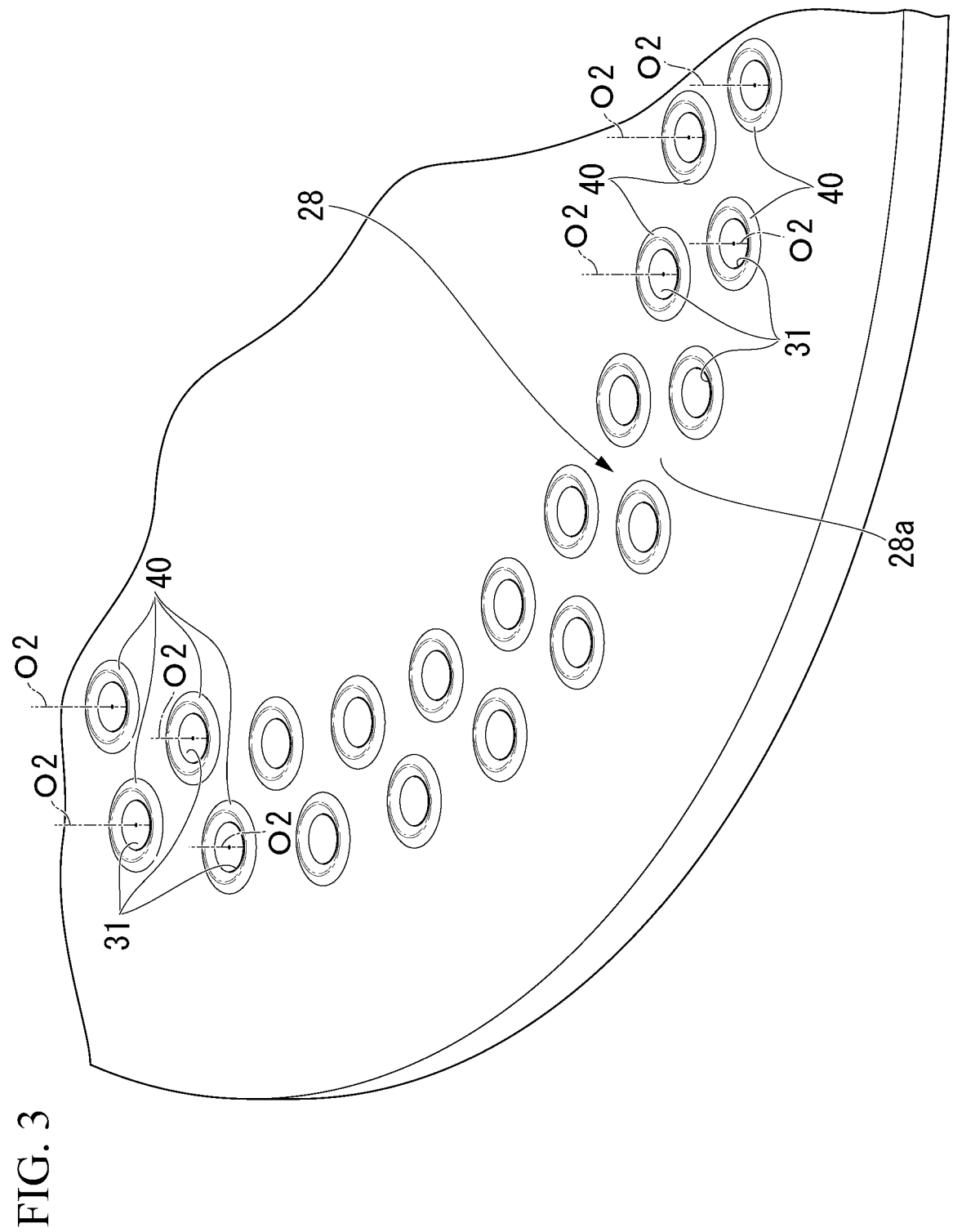
FIG. 3 is a partially enlarged perspective view of a first barrier illustrated in FIG. 1.

Further, in the present embodiment, as illustrated in FIGS. 2 and 3, in the first barrier 28, a protrusion 40 which protrudes toward the main liquid chamber 14 is formed over the entire circumference of the opening circumferential edge portion of the pore 31 in a surface 28a facing the main liquid chamber 14. In the illustrated example, the protrusion 40 is formed continuously over the entire circumference. The protrusion 40 is formed at the opening circumferential edge portion of all the pores 31 in the surface 28a of the first barrier 28. The protrusion 40 may be formed in a surface 29a of the second barrier 29 facing the auxiliary liquid chamber 15.

The axial size of the protrusion 40 is smaller than the inner diameter of the pore 31. Accordingly, an increase in the axial size of the entire pores 31 and the protrusions can be suppressed, and an increase in the flow velocity of the liquid flowing from the pores 31 into the main liquid chamber 14 can be suppressed. The axial size the protrusion 40 is equal to the size in the hole radial direction between the inner circumferential surface and the outer circumferential surface of the protrusion 40. The plurality of protrusions 40 have the same shape and the same size. The plurality of protrusions 40 may have different shapes and sizes. In addition, at least one of the plurality of pores 31 may be provided with the protrusion 40.

The protrusion 40 may be formed at the opening circumferential edge portion of at least the pore 31 which is located farthest from the other of the first communication portion 26 and the second communication portion 27 along the flow path direction, among the plurality of pores 31 in the surface 28*a* of the first barrier 28. In the illustrated example, the protrusion 40 is formed at the opening circumferential edge portion of at least the pore 31 which is located farthest from the second communication portion 27 along the flow path direction, among the plurality of pores 31 in the surface 28*a* of the first barrier 28.

Accordingly, the protrusion 40 is formed at the opening circumferential edge portion of the pore 31 at which the flow rate of the liquid L flowing through the main body flow path 25 increases due to the inertia in the surface 28*a*. Therefore, a configuration in which the protrusion 40 is formed only at the opening circumferential edge portion of the pore 31 which is located closest to the second communication portion 27 along the flow path direction in the surface 28*a* will be compared to the above-described configuration, and the operational effect of the protrusion 40, which will be described later, can be significantly achieved. The protrusion 40 may be formed at the opening circumferential edge portion of at least the pore 31 which is located closest to the second communication portion 27 along the flow path direction among the plurality of pores 31 in the surface 28*a* of the first barrier 28.

Figure 4:
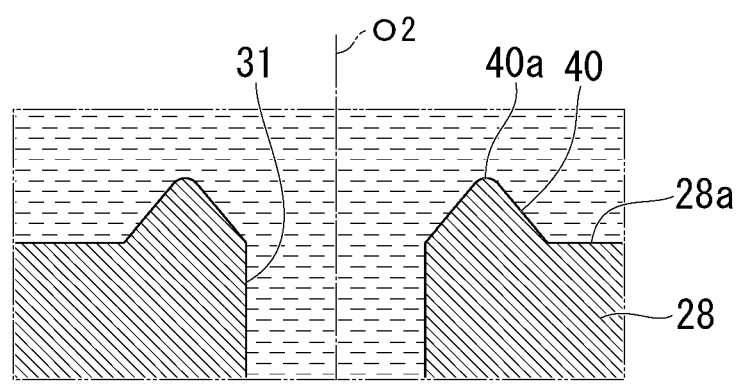
FIG. 4 is a longitudinal sectional view of a pore illustrated in FIG. 1.

In the present embodiment, the inner circumferential surface of the protrusion 40 has a similar shape to the inner circumferential surface of the pore 31 in a plan view as viewed in the axial direction of the pore 31. In the illustrated example, as illustrated in FIG. 4, the inner circumferential surface of the protrusion 40 is connected to the inner circumferential surface of the pore 31 in the hole radial direction without a stepped portion. The inner circumferential surface of the protrusion 40 and the inner circumferential surface of the pore 31 may be separated from each other in the hole radial direction.

As illustrated in FIG. 4, a top portion 40*a* of the protrusion 40 is formed in an acute angle shape or a curved surface shape which gradually decreases in thickness along the hole radial direction toward the upper side in the longitudinal sectional view. In the illustrated example, the top portion 40*a* is formed in a curved surface shape protruding upward, and is located at the central portion in the hole radial direction between the inner circumferential surface and the outer circumferential surface of the protrusion 40.

In the vibration dampening device 10 having such a configuration, when vibration is input, both the mounting members 11 and 12 are relatively displaced while elastically deforming the elastic body 13. Then, the liquid pressure in the main liquid chamber 14 fluctuates, and the liquid L in the main liquid chamber 14 flows into the auxiliary liquid chamber 15 through the restriction passage 24, and the liquid L in the auxiliary liquid chamber 15 flows into the main liquid chamber 14 through the restriction passage 24.

According to the vibration dampening device 10 according to the present embodiment, when the liquid L flows into the main liquid chamber 14 through the plurality of pores 31 from the main body flow path 25, the liquid L flows through each of the pores 31 while being subjected to pressure loss by the first barrier 28 in which the pores 31 are formed, so that the flow velocity of the liquid L flowing into the main liquid chamber 14 can be suppressed.

Moreover, since the liquid L flows through the plurality of pores 31 instead of a single pore 31, the liquid L can be branched into a plural of flows and can be circulated, so that the flow velocity of the liquid L which has passed through the individual pores 31 can be reduced. Accordingly, even if a large load (vibration) is input to the vibration dampening device 10, the difference in flow velocity generated between the liquid L which has flowed into the main liquid chamber 14 through the pores 31 and the liquid L in the main liquid chamber 14 can be suppressed, so that the generation of a vortex caused by the difference in flow velocity and the generation of bubbles caused by the vortex can be suppressed.

Furthermore, even if bubbles are generated in the main body flow path 25 instead of the main liquid chamber 14, the bubbles generated by causing the liquid L to pass through the plurality of pores 31 can be separated from each other in the main liquid chamber 14, so that joining and growing of the bubbles are suppressed and the bubbles can be easily maintained in a finely dispersed state.

Furthermore, at the opening circumferential edge portion of the pore 31 in the surface 28*a* of the first barrier 28, the protrusion 40 that has an inner circumferential surface with a shape similar to that of the pore 31 in the plan view and protrudes toward the main liquid chamber 14 is formed over the entire circumference. Therefore, since the liquid L can be caused to flow from the pores 31 into the main liquid chamber 14 along the inner circumferential surface of the protrusion 40, at the opening circumferential edge portion of the pore 31 in the surface 28*a* of the first barrier 28, the occurrence of separation of the flow of the liquid L can be suppressed, and the velocity of the liquid L flowing from the pores 31 into the main liquid chamber 14 can be suppressed.

As described above, the generation of bubbles themselves can be suppressed, and even if bubbles are generated, the bubbles can be easily maintained in a finely dispersed state. Therefore, even if cavitation collapse in which bubbles collapse occurs, abnormal sound generated can be suppressed.

In addition, since the protrusion 40 is formed over the entire circumference of the opening circumferential edge portion of the pore 31 in the surface 28*a* of the first barrier 28, at the opening circumferential edge portion of the pore 31, the occurrence of separation of the flow of the liquid can be suppressed over the entire circumference regardless of the position in the circumferential direction, and the velocity of the liquid flowing from the pores 31 into the main liquid chamber 14 or the auxiliary liquid chamber 15 can be suppressed.

In addition, since the top portion 40*a* of the protrusion 40 is formed in a curved surface shape, no top surface facing the main liquid chamber 14 is formed in the top portion 40*a*. Therefore, the occurrence of a vortex between the liquid L that has passed through the pores 31 and the top portion of the protrusion 40 can be suppressed, so that the generation of bubbles can be effectively suppressed.

Second Embodiment

Next, a vibration dampening device according to a second embodiment of the present invention will be described. Like configurations the same as those of the first embodiment are denoted by like reference numerals, and the description thereof will be omitted. Only different points will be described.

In addition, the description of the same actions will be omitted.

Figure 5:
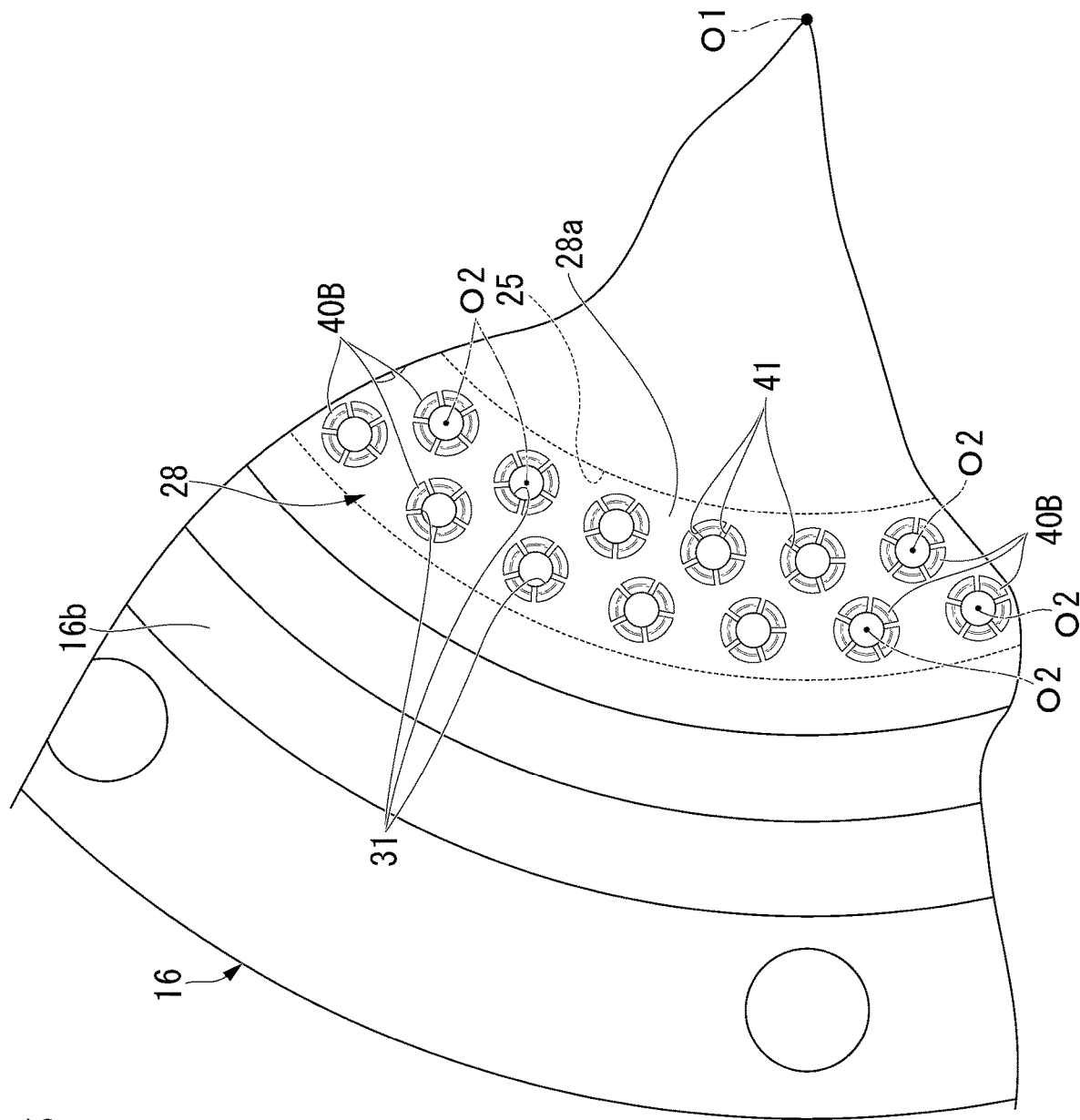
FIG. 5 is a partially enlarged plan view of a partition member according to a second embodiment of the present invention.

As illustrated in FIG. 5, in the vibration dampening device according to the present embodiment, a protrusion 40B is intermittently formed over the entire circumference at the opening circumferential edge portion of the pore 31 in the surface 28a of the first barrier 28 facing the main liquid chamber 14. That is, a plurality of intermittent portions 41 are formed in the protrusion 40B at intervals in the hole circumferential direction. In the illustrated example, five intermittent portions are formed in the protrusion 40B at equal intervals in the hole circumferential direction. It is desirable that the sum of the circumferential lengths of the plurality of intermittent portions 41 is equal to or less than 20% of the circumferential length of the opening circumferential edge portion of the pore 31.

The plurality of intermittent portions 41 are formed at portions avoiding positions having the central axis O2 interposed therebetween in the hole radial direction in the opening circumferential edge portion of the pore 31 in the surface 28a. That is, the intermittent portion 41 is opposed to the inner circumferential surface of the protrusion 40B in the hole radial direction.

As described above, since the intermittent portion 41 is opposed to the inner circumferential surface of the protrusion 40B in the hole radial direction, when the liquid flows from the main body flow path 25 into the main liquid chamber 14 through the pores 31, even if bubbles are generated at the plurality of intermittent portions 41, in a case where these bubbles flow in the main liquid chamber 14, flowing of the bubbles along the liquid flowing from the pores 31 into the main liquid chamber 14 and joining the bubbles can be suppressed.

In addition, in the vibration dampening device of the present invention, the inner circumferential surface of the protrusion has a shape similar to the inner circumferential surface of the pore in the plan view of the barrier.

According to the present invention, when vibration is input, both the mounting members are relatively displaced while elastically deforming the elastic body, the liquid pressure of at least one of the first liquid chamber and the second liquid chamber fluctuates, and the liquid tries to circulate between the first liquid chamber and the second liquid chamber through the restriction passage. At this time, the liquid flows into the restriction passage through one of the first communication portion and the second communication portion, passes through the main body flow path, and then flows out from the restriction passage through the other of the first communication portion and the second communication portion.

In this case, when the liquid flows into the first liquid chamber or the second liquid chamber through the plurality of pores from the main body flow path, the liquid flows through each of the pores while being subjected to pressure loss by the barrier in which the pores are formed, so that the flow velocity of the liquid flowing into the first liquid chamber or the second liquid chamber can be suppressed.

Moreover, since the liquid flows through the plurality of pores instead of a single pore, the liquid can be branched into a plural of flows and can be circulated, so that the flow velocity of the liquid which has passed through the individual pores can be reduced. Accordingly, even if a large load (vibration) is input to the vibration dampening device, the difference in flow velocity generated between the liquid which has flowed into the first liquid chamber or the second liquid chamber through the pores and the liquid in the first liquid chamber or the second liquid chamber can be suppressed, so that the generation of a vortex caused by the difference in flow velocity and the generation of bubbles caused by the vortex can be suppressed.

Furthermore, even if bubbles are generated in the main body flow path instead of the first liquid chamber or the second liquid chamber, by causing the liquid to pass through the plurality of pores, the generated bubbles can be separated from each other in the first liquid chamber or the second liquid chamber, so that joining and growing of the bubbles are suppressed and the bubbles can be easily maintained in a finely dispersed state.

In addition, at the opening circumferential edge portion of the pore in the surface of the barrier, the protrusion that has an inner circumferential surface with a shape similar to that of the pore in the plan view and protrudes toward the first liquid chamber or the second liquid chamber is formed.

Therefore, since the liquid can be caused to flow from the pores into the first liquid chamber or the second liquid chamber along the inner circumferential surface of the protrusion, at the opening circumferential edge portion of the pore in the surface of the barrier, the occurrence of separation of the flow of the liquid can be suppressed, and the velocity of the liquid flowing from the pores into the first liquid chamber or the second liquid chamber can be suppressed.

As described above, the generation of bubbles themselves can be suppressed, and even if bubbles are generated, the bubbles can be easily maintained in a finely dispersed state. Therefore, even if cavitation collapse in which bubbles collapse occurs, abnormal sound generated can be suppressed.

In addition, the protrusion may be formed over the entire circumference of the opening circumferential edge portion of the pore in the surface of the barrier.

In this case, since the protrusion is formed over the entire circumference of the opening circumferential edge portion of the pore in the surface of the barrier, at the opening circumferential edge portion of the pore, the occurrence of separation of the flow of the liquid can be suppressed over the entire circumference regardless of the position in the circumferential direction, and the velocity of the liquid flowing from the pores into the first liquid chamber or the second liquid chamber can be suppressed.

In addition, the top portion of the protrusion may be formed in an acute angle shape or a curved surface shape which gradually decreases in thickness in the hole radial direction orthogonal to the hole axial direction toward the outside of the pore along the hole axial direction along the central axis of the pore in the longitudinal sectional view.

In this case, since the top portion of the protrusion is formed in an acute angle shape or a curved surface shape, no top surface facing the first liquid chamber or the second liquid chamber is formed in the top portion. Therefore, the occurrence of a vortex between the liquid that has passed through the pores and the top portion of the protrusion can be suppressed, so that the generation of bubbles can be effectively suppressed.

Third Embodiment

Hereinafter, a vibration dampening device according to a third embodiment of the present invention will be described. Like configurations the same as those of the first embodiment are denoted by like reference numerals, and the description thereof will be omitted. Only different points will be described.

In addition, the description of the same actions will be omitted.

Figure 6:
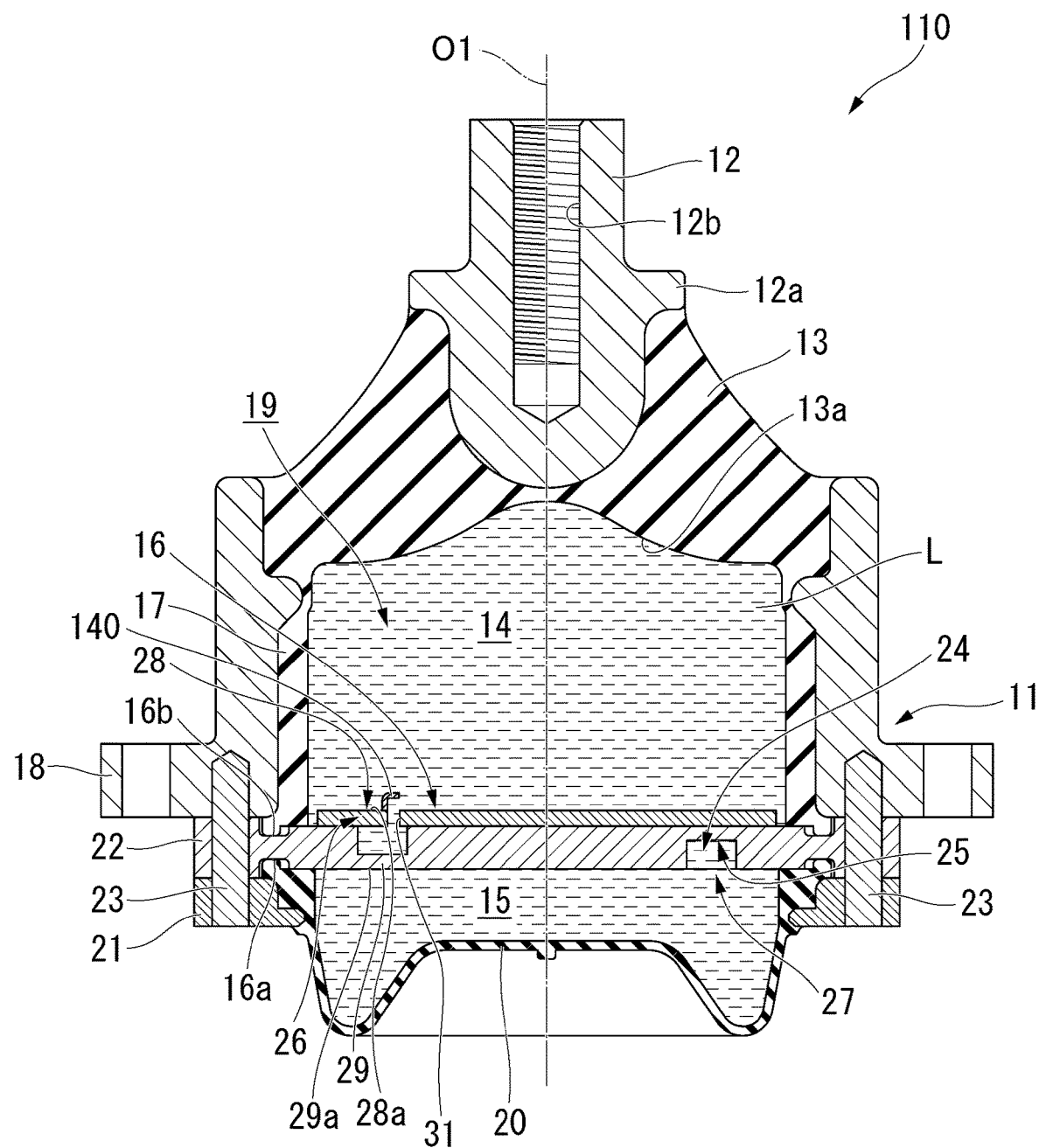
FIG. 6 is a longitudinal sectional view of a vibration dampening device according to a third embodiment of the present invention.

As illustrated in FIG. 6, a vibration dampening device 110 is a liquid-sealed type vibration dampening device including: the cylindrical first mounting member 11 connected to any one of the vibration generating portion and the vibration receiving portion, the second mounting member 12 connected to the other of the vibration generating portion and the vibration receiving portion, the elastic body 13 which elastically connects the first mounting member 11 and the second mounting member 12 to each other, and the partition member 16 which partitions the inside of the first mounting member 11 into the main liquid chamber (first liquid chamber) 14 and the auxiliary liquid chamber (second liquid chamber) 15, which will be described later.

Figure 7:
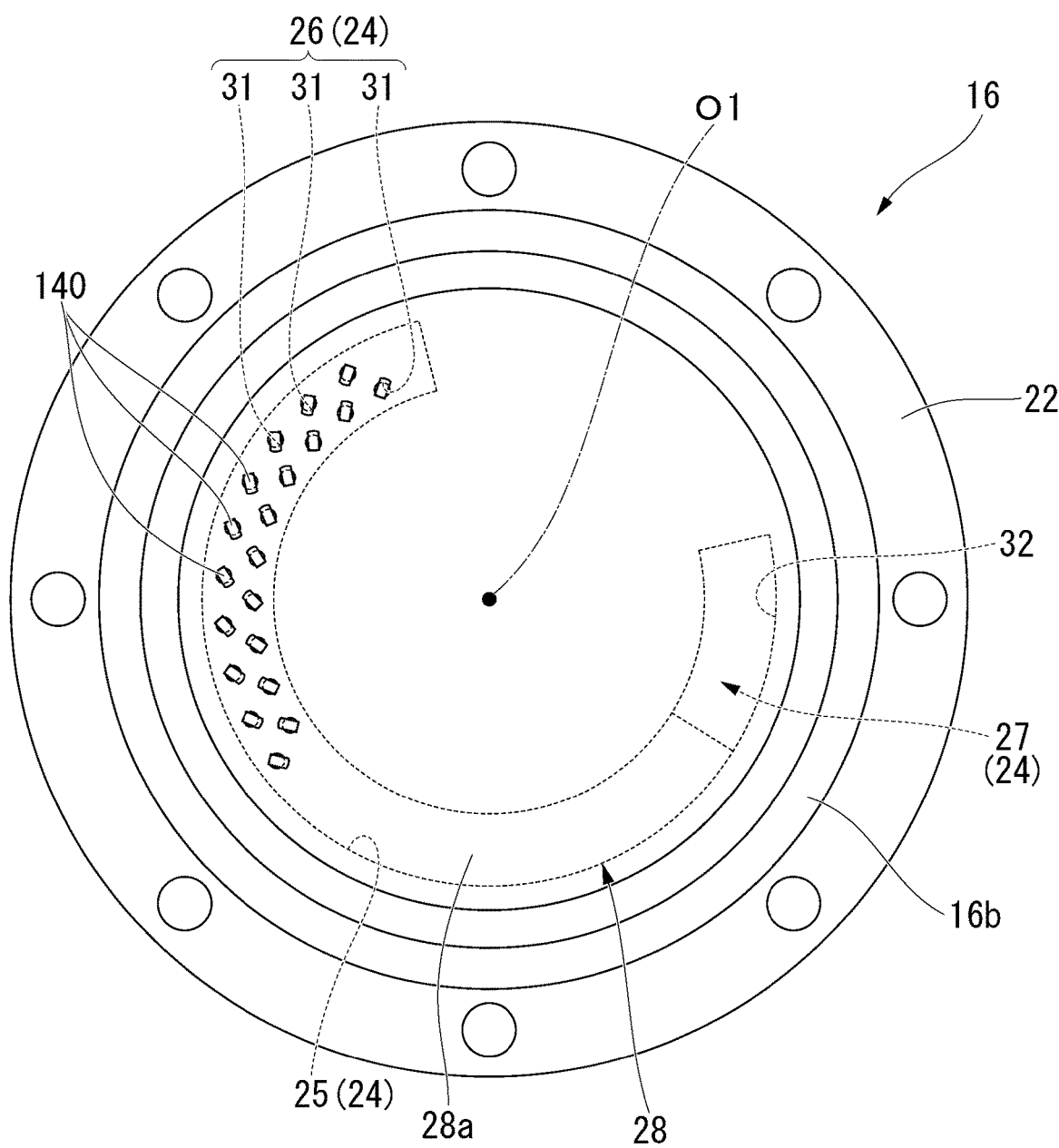
FIG. 7 is a plan view of a partition member of the vibration dampening device illustrated in FIG. 6.

In the partition member 16, the restriction passage 24 that causes the main liquid chamber 14 and the auxiliary liquid chamber 15 to communicate with each other is formed. As illustrated in FIGS. 6 and 7, the restriction passage 24 includes the first communication portion 26 that is open to the main liquid chamber 14, the second communication portion 27 that is open to the auxiliary liquid chamber 15, the main body flow path 25 that causes the first communication portion 26 and the second communication portion 27 to communicate with each other.

In the present embodiment, an awning portion (protrusion) 140 which covers the pore 31 is formed at the opening circumferential edge portion of the pore 31 in the surface 28a of the first barrier 28 facing the main liquid chamber 14. The awning portion 140 extends upward from the surface 28a of the first barrier 28.

The awning portion 140 may be formed on a second surface 29a of the second barrier 29 facing the auxiliary liquid chamber 15.

In the present embodiment, two or more of a plurality of the awning portions 140 are different from each other in the direction (hereinafter, referred to as an extension direction) from the central portion of the pore 31 in the hole circumferential direction at a base end portion 141 of the awning portion 140 connected to the first barrier 28 to the central portion in the hole circumferential direction at an open end portion 142 of the awning portion 140 in the plan view. In the illustrated example, the extension directions of all the awning portions 140 are different from each other.

Among the plurality of awning portions 140, the extension directions of the awning portions 140 positioned inward in the radial direction are directed toward a portion of the main liquid chamber 14 located inward of the main body flow path 25 in the radial direction in the plan view and directed toward one side of the circumferential direction. In addition, among the plurality of awning portions 140, the extension directions of the awning portions 140 positioned outward in the radial direction are directed toward a portion of the main liquid chamber 14 located outward of the main body flow path 25 in the radial direction in the plan view and directed toward the other side of the circumferential direction.

The inclination angles of the extension directions of all the awning portions 140 with respect to the straight lines connecting the central axis O1 to the central axes O2 are equal to each other.

Figure 8:
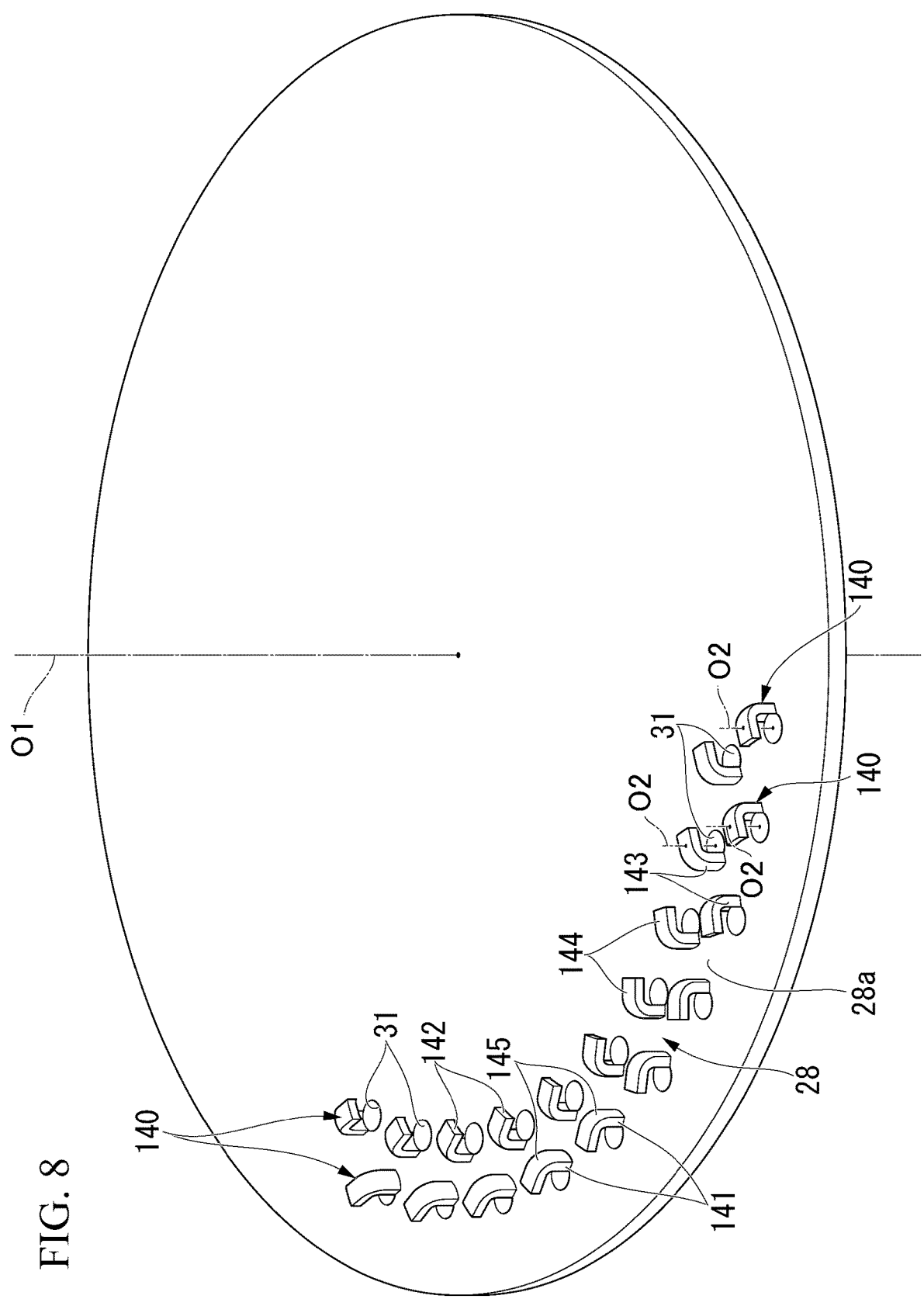
FIG. 8 is a perspective view of a first barrier illustrated in FIG. 6.

In addition, in the present embodiment, as illustrated in FIGS. 7 and 8, the awning portion 140 is formed at the opening circumferential edge portion of at least the pore 31 located farthest from the second communication portion 27 along the flow path direction, among the plurality of pores 31 in the surface 28a of the first barrier 28. In the illustrated example, the awning portions 140 are formed at the opening circumferential edge portions of all the pores 31 in the first barrier 28. The awning portions 140 may be formed only at the opening circumferential edge portions of the pores 31 located farthest from the second communication portion 27 along the flow path direction in the first barrier 28.

Figure 9:
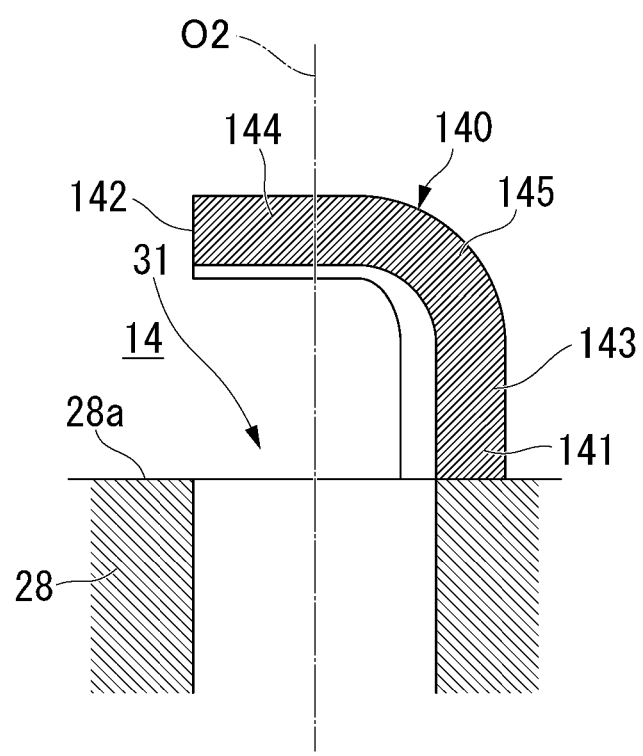
FIG. 9 is a longitudinal sectional view of a pore and an awning portion illustrated in FIG. 6.

As illustrated in FIG. 9, the awning portion 140 includes a first wall portion 143 extending upward from the surface 28a of the first barrier 28, and a second wall portion 144 extending inward in the hole radial direction from the upper end of the first wall portion 143. A connection portion 145 between the first wall portion 143 and the second wall portion 144 is formed in a curved surface shape protruding outward in the hole radial direction. The first wall portion 143 and the second wall portion 144 are formed integrally with each other and have the same thickness.

The base end portion 141 is the lower end portion of the first wall portion 143. That is, the awning portion 140 has the base end portion 141. The open end portion 142 is a portion of the second wall portion 144 located on the side opposite to the connection portion 145 with the central axis O2 interposed therebetween in the hole radial direction.

As illustrated in FIG. 9, the first wall portion 143 is formed along the hole circumferential direction, and the inner surface of the first wall portion 143 facing inward in the hole radial direction is flush with the inner circumferential surface of the pore 31. Both end portions of the first wall portion 143 in the hole circumferential direction are located in a range in which the central angle centered on the central axis O2 is 90° or less. Accordingly, when vibration is input, which will be described later, the liquid L which has flowed from the pores 31 into the main liquid chamber 14 and collides with the second wall portion 144 of the awning portion 140 can flow out not only in the extension direction but also in a direction orthogonal to this direction in the plan view.

In the sectional view as illustrated in FIG. 9, the position of the open end portion 142 of the second wall portion 144 in the hole radial direction is equal to a portion opposite to the portion of the opening circumferential edge portion of the pore 31 connected to be base end portion 141 in the surface 28a of the first barrier 28 with the central axis O2 interposed therebetween in the hole radial direction.

In the vibration dampening device 110 having such a configuration, when vibration is input, both the mounting members 11 and 12 are relatively displaced while elastically deforming the elastic body 13. Then, the liquid pressure in the main liquid chamber 14 fluctuates, and the liquid L in the main liquid chamber 14 flows into the auxiliary liquid chamber 15 through the restriction passage 24, and the liquid L in the auxiliary liquid chamber 15 flows into the main liquid chamber 14 through the restriction passage 24.

According to the vibration dampening device 110 according to the present embodiment, when the liquid L flows into the main liquid chamber 14 through the plurality of pores 31 from the main body flow path 25, the liquid L flows through each of the pores 31 while being subjected to pressure loss by the first barrier 28 in which the pores 31 are formed, so that the flow velocity of the liquid L flowing into the main liquid chamber 14 can be suppressed.

Moreover, since the liquid L flows through the plurality of pores 31 instead of a single pore 31, the liquid L can be branched into a plural of flows and can be circulated, so that the flow velocity of the liquid L which has passed through the individual pores 31 can be reduced. Accordingly, even if a large load (vibration) is input to the vibration dampening device 110, the difference in flow velocity generated between the liquid L which has flowed into the main liquid chamber 14 through the pores 31 and the liquid L in the main liquid chamber 14 can be suppressed, so that the generation of a vortex caused by the difference in flow velocity and the generation of bubbles caused by the vortex can be suppressed.

Furthermore, even if bubbles are generated in the main body flow path 25 instead of the main liquid chamber 14, the bubbles generated by causing the liquid L to pass through the plurality of pores 31 can be separated from each other in the main liquid chamber 14, so that joining and growing of the bubbles are suppressed and the bubbles can be easily maintained in a finely dispersed state.

Furthermore, since the plurality of awning portions 140 covering the pores 31 are formed at the opening circumferential edge portions of the pores 31 in the surface 28a of the first barrier 28, a pressure loss can be generated by causing the liquid L that has flowed from the pores 31 into the main liquid chamber 14 to collide with the awning portions 140. Therefore, the difference in flow velocity generated between the liquid L which has flowed in as described above and the liquid in the main liquid chamber 14 can be effectively suppressed.

As described above, according to the vibration dampening device according to the present embodiment, since the generation of bubbles themselves can be suppressed, even if bubbles are generated, the bubbles can be easily maintained in a finely dispersed state. Therefore, even if cavitation collapse in which bubbles collapse occurs, abnormal sound generated can be suppressed.

In addition, since at least two of the plurality of awning portions 140 are arranged such that the extension directions are different from each other, when the liquid L flows into the main liquid chamber 14 from each of the pores 31, or when the liquid L is circulated through the main body flow path 25, even if bubbles are generated, the directions of the generated individual bubbles flowing in the main liquid chamber 14 or the auxiliary liquid chamber 15 can be caused to be different from each other. Therefore, according to the vibration dampening device in the present embodiment, joining and growing of the bubbles in the main liquid chamber 14 or the auxiliary liquid chamber 15 are suppressed and the bubbles can be easily maintained in a finely dispersed state.

Accordingly, according to the vibration dampening device, even if cavitation collapse in which bubbles collapse occurs, abnormal sound generated can be more effectively suppressed.

Furthermore, since the awning portions 140 covering the adjacent pores 31 are arranged so that the extension directions thereof are different from each other in the plan view, the directions of the flows of the liquid L that have flowed from the adjacent pores 31 into the main liquid chamber 14 can be different from each other. Therefore, when the liquid flows from each of the pores into the main liquid chamber 14 or the auxiliary liquid chamber 15, or when the liquid L is circulated through the main body flow path 25, even if bubbles are generated, the directions of the individual bubbles flowing in the main liquid chamber 14 or the auxiliary liquid chamber 15 are different from each other. Therefore, according to the vibration dampening device in the present embodiment, joining and growing of the bubbles in the main liquid chamber 14 or the auxiliary liquid chamber 15 can be effectively suppressed and the bubbles can be more easily maintained in a finely dispersed state.

In addition, since the plurality of pores 31 are formed in the first barrier 28 at intervals in the flow path direction and the awning portions 140 are formed at the opening circumferential edge portions of at least the pores 31 located farthest from the second communication portion 27 along the flow path direction among the plurality of pores 31, the pores 31 at which the flow rate of the liquid L flowing through the main body flow path 25 increases due to the inertia of the liquid L are covered by the awning portions 140. Therefore, a pressure loss can be generated by causing the liquid L that has flowed from the pores 31 at which the flow rate is high to collide with the awning portions 140, and the difference in flow velocity generated between the liquid L which has flowed into the main liquid chamber 14 and the liquid L in the main liquid chamber 14 can be more effectively suppressed.

Fourth Embodiment

Next, a vibration dampening device according to a fourth embodiment of the present invention will be described. Like configurations the same as those of the first embodiment are denoted by like reference numerals, and the description thereof will be omitted. Only different points will be described. In addition, the description of the same actions will be omitted.

Figure 10:
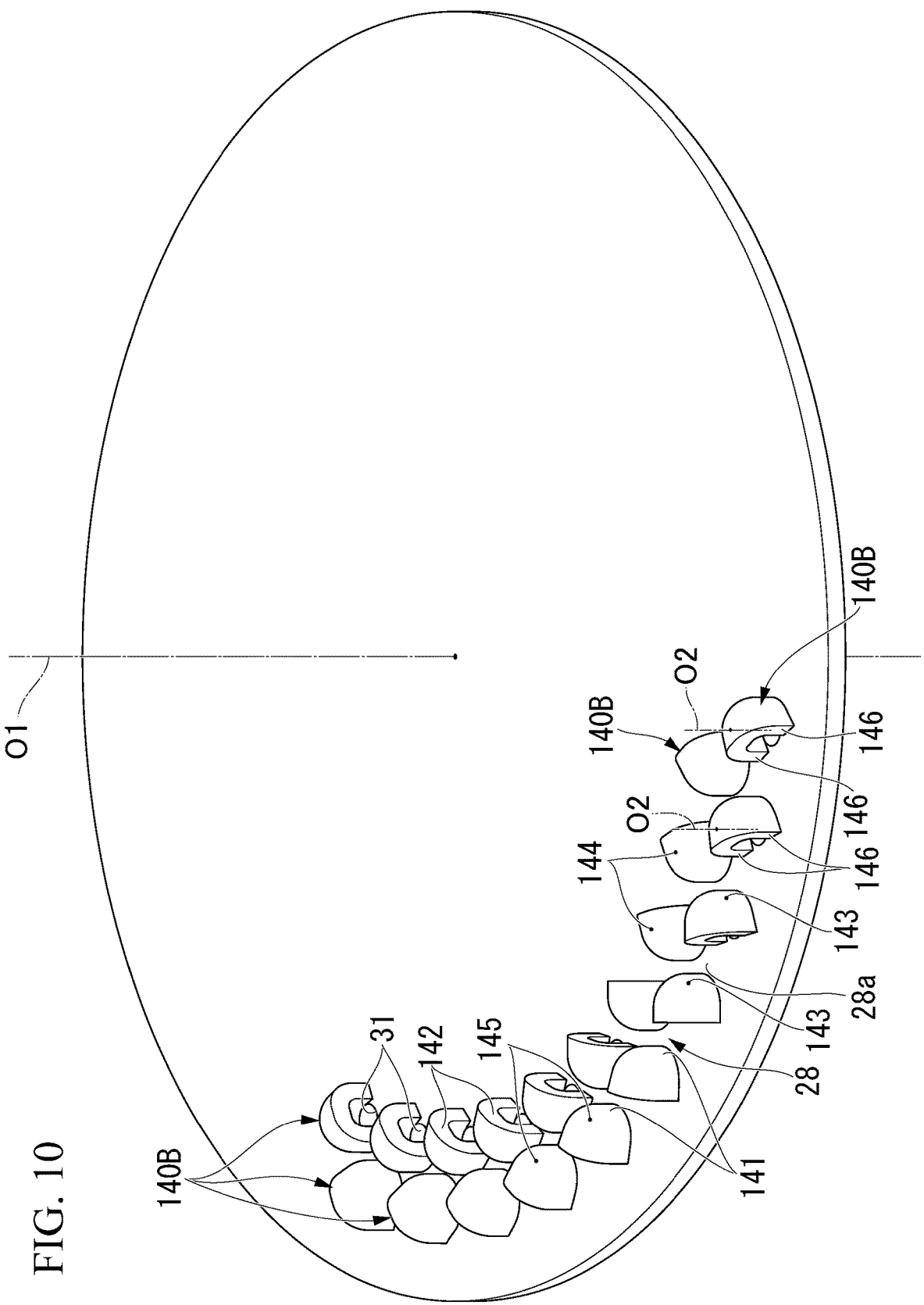
FIG. 10 is a perspective view of a first barrier according to a fourth embodiment of the present invention.

As illustrated in FIG. 10, in the vibration dampening device according to the present embodiment, an awning portion 140B includes a pair of side wall portions 146 covering the awning portion 140B from both sides in a direction orthogonal to the extension direction of the awning portion 140B in the plan view. In the illustrated example, the side wall portions 146 connects both ends of each of the first wall portion 143 and the second wall portion 144 in the hole circumferential direction and are connected to the opening circumferential edge portion of the pore 31 in the surface 28a. The pair of side wall portions 146 are formed integrally with the first wall portion 143 and the second wall portion 144. The awning portion 140B is disposed over a range in which the central angle centered on the central axis O2 is 270° in the opening circumferential edge portion of the pore 31 in the surface 28a of the first barrier 28.

As described above, since the awning portion 140B includes the side wall portions 146, the flow path area after the liquid L that has flowed into the main liquid chamber 14 from the pores 31 collides with the second wall portion 144 can be reduced, so that the pressure loss effect by the awning portion 140B can be further increased.

Fifth Embodiment

Next, a vibration dampening device according to a fifth embodiment of the present invention will be described. Like configurations the same as those of the first embodiment are denoted by like reference numerals, and the description thereof will be omitted. Only different points will be described. In addition, the description of the same actions will be omitted.

Figure 11:
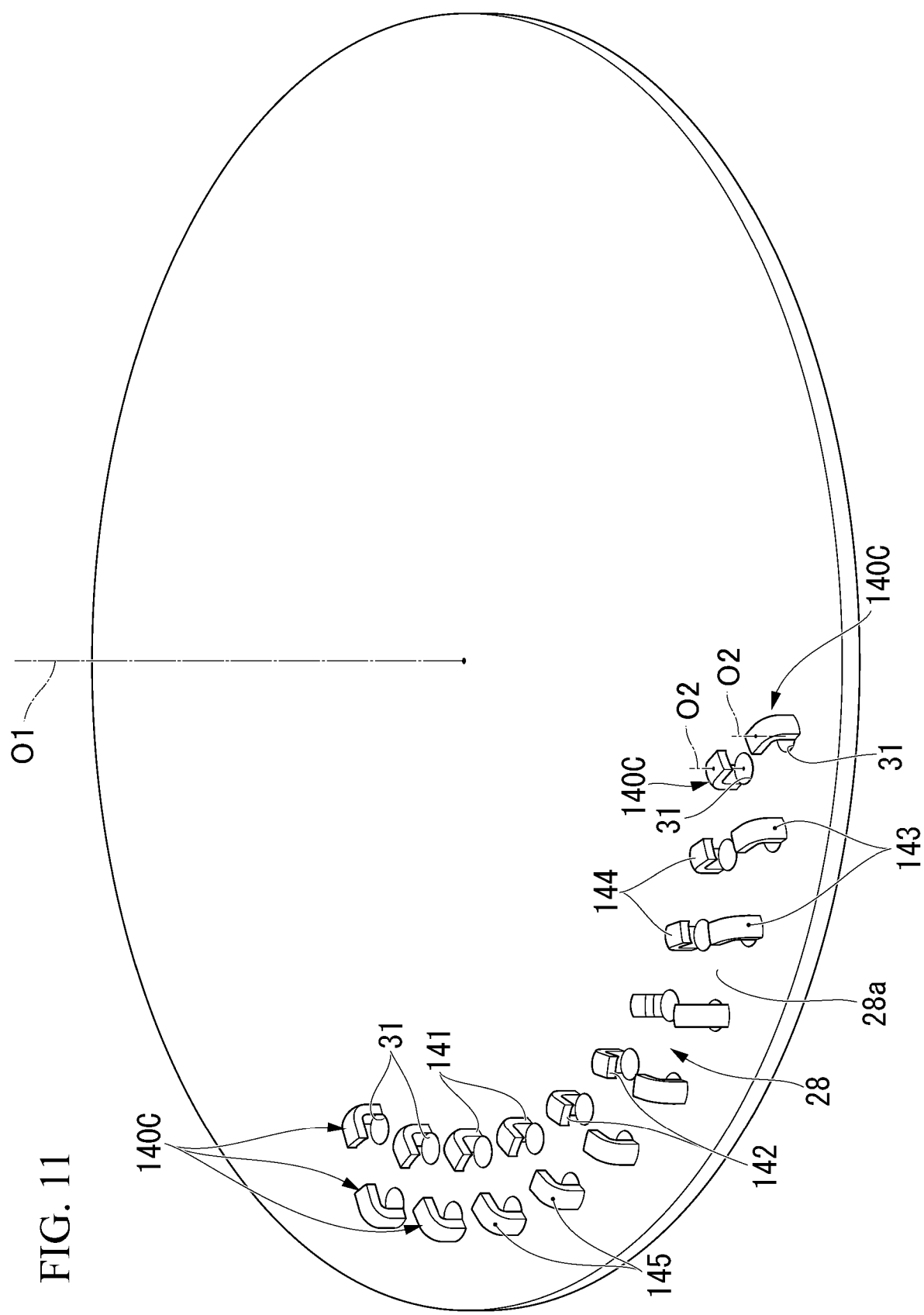
FIG. 11 is a perspective view of a first barrier according to a fifth embodiment of the present invention.

As illustrated in FIG. 11, in the vibration dampening device according to the present embodiment, at least two of the open end portions 142 in awning portions 140C covering the plurality of pores 31 are opposed to each other. In the illustrated example, the open end portions 142 of the awning portions 140C covering the pores 31 adjacent to each other in the radial direction are opposed to each other at an interval in the hole radial direction. That is, the extension directions of the awning portions 140C covering the pores 31 adjacent to each other in the radial direction are opposite to each other.

Accordingly, the flows of the liquid L which have flowed from the pores 31 into the main liquid chamber 14 are guided in directions opposite to each other by the corresponding awning portions 140C. Therefore, by causing the flows of the liquid L that have flowed from the pores 31 into the main liquid chamber 14 to collide with each other, a pressure loss can be generated more significantly, and the difference in flow velocity generated between the liquid L which has flowed into the main liquid chamber 14 and the liquid L in the main liquid chamber 14 can be more effectively suppressed.

The awning portions 140C covering the pores 31 adjacent to each other in the circumferential direction are not limited to such an aspect and may be opposed to each other in the hole radial direction.

The protrusion is the awning portion formed to cover the pore.

According to the present invention, when vibration is input, both the mounting members are relatively displaced while elastically deforming the elastic body, the liquid pressure of at least one of the first liquid chamber and the second liquid chamber fluctuates, and the liquid tries to circulate between the first liquid chamber and the second liquid chamber through the restriction passage. At this time, the liquid flows into the restriction passage through one of the first communication portion and the second communication portion, passes through the main body flow path, and then flows out from the restriction passage through the other of the first communication portion and the second communication portion.

In this case, when the liquid flows into the first liquid chamber or the second liquid chamber through the plurality of pores from the main body flow path, the liquid flows through each of the pores while being subjected to pressure loss by the barrier in which the pores are formed, so that the flow velocity of the liquid flowing into the first liquid chamber or the second liquid chamber can be suppressed.

Moreover, since the liquid flows through the plurality of pores instead of a single pore, the liquid can be branched into a plural of flows and can be circulated, so that the flow velocity of the liquid which has passed through the individual pores can be reduced. Accordingly, even if a large load (vibration) is input to the vibration dampening device, the difference in flow velocity generated between the liquid which has flowed into the first liquid chamber or the second liquid chamber through the pores and the liquid in the first liquid chamber or the second liquid chamber can be suppressed, so that the generation of a vortex caused by the difference in flow velocity and the generation of bubbles caused by the vortex can be suppressed.

Furthermore, even if bubbles are generated in the main body flow path instead of the first liquid chamber or the second liquid chamber, the bubbles generated by causing the liquid to pass through the plurality of pores can be separated from each other in the first liquid chamber or the second liquid chamber, so that joining and growing of the bubbles are suppressed and the bubbles can be easily maintained in a finely dispersed state.

Moreover, since the awning portions covering the pores are formed at the opening circumferential edge portions of the pores in the surface of the barrier, a pressure loss can be generated by causing the liquid that has flowed from the pores into the first liquid chamber or the second liquid chamber to collide with the awning portions, and the difference in flow velocity generated between the liquid which has flowed in as described above and the liquid in the first liquid chamber or the second liquid chamber can be more effectively suppressed.

As described above, the generation of bubbles themselves can be suppressed, and even if bubbles are generated, the bubbles can be easily maintained in a finely dispersed state. Therefore, even if cavitation collapse in which bubbles collapse occurs, abnormal sound generated can be suppressed.

In addition, the awning portions have the base end portion connected to the barrier, and may be arranged so that two or more of the plurality of the awning portions are different from each other in the direction from the central portion of the pore in the hole circumferential direction around the central axis at the base end portion of the awning portion to the central portion in the hole circumferential direction at the open end portion of the awning portion in the plan view.

In this case, since two or more of the plurality of awning portions are different from each other in the direction from the central portion in the hole circumferential direction at the base end portion of the awning portion to the central portion in the hole circumferential direction at the open end portion (hereinafter, referred to as an extension direction), when the liquid flows into the first liquid chamber or the second liquid chamber from each of the pores, or when the liquid is circulated through the main body flow path, even if bubbles are generated, the directions of the generated individual bubbles flowing in the first liquid chamber or the second liquid chamber can be caused to be different from each other. Therefore, joining and growing of the bubbles in the first liquid chamber or the second liquid chamber are suppressed and the bubbles can be easily maintained in a finely dispersed state.

Accordingly, even if cavitation collapse in which bubbles collapse occurs, abnormal sound generated can be more effectively suppressed.

In addition, the awning portions covering the adjacent pores may be arranged so that the directions thereof from the central portion in the hole circumferential direction at the base end portion of the awning portion to the central portion in the hole circumferential direction at the open end portion of the awning portion may be different from each other in the plan view.

In this case, since the extension directions of the awning portions covering the adjacent pores different from each other, the directions of the flows of the liquid that have flowed from the adjacent pores into the first liquid chamber or the second liquid chamber can be different from each other. Therefore, when the liquid flows from each of the pores into the first liquid chamber or the second liquid chamber, or when the liquid is circulated through the main body flow path, even if bubbles are generated, the directions of the individual bubbles flowing in the first liquid chamber or the second liquid chamber are different from each other, so that joining and growing of the bubbles in the first liquid chamber or the second liquid chamber can be effectively suppressed and the bubbles can be more easily maintained in a finely dispersed state.

In addition, the plurality of pores may be formed in the barrier at intervals in the flow path direction of the main body flow path, and the protrusion may be formed at least at the opening circumferential edge portion of the pore located farthest from the other of the first communication portion and the second communication portion along the flow path direction, among the plurality of pores in the surface of the barrier.

In this case, among the plurality of pores, the pore which is located farthest from the other of the first communication portion and the second communication portion along the flow path direction and at which the flow rate of the liquid flowing through the main body flow path increases due to the inertia of the liquid is covered by the awning portion. Therefore, a pressure loss can be generated by causing the liquid that has flowed from the pores at which the flow rate is high to collide with the awning portions, and the difference in flow velocity generated between the liquid which has flowed into the first liquid chamber or the second liquid chamber and the liquid in the first liquid chamber or the second liquid chamber can be more effectively suppressed.

The technical scope of the present invention is not limited to the embodiment described above, and various modifications can be made without departing from the scope of the present invention. For example, in the embodiment, the configuration in which the top portion 40a of the protrusions 40 and 40B is formed in an acute angle shape or a curved surface shape is described, but the top portion 40a is not limited to such an aspect. The top portion 40a may be formed on a flat surface.

Moreover, in the third to fifth embodiments, the configuration in which the awning portions 140, 140B, and 140C are respectively provided in the plurality of pores 31 is described, but the awning portions 140, 140B, and 140C are not limited to such an aspect. The awning portions 140, 140B, and 140C may be provided in only one of the plurality of pores 31. That is, the awning portions 140, 140B, and 140C may be provided in at least one of the plurality of pores 31.

Moreover, in the third to fifth embodiments, the configuration in which the extension directions of two or more of a plurality of the awning portions 140, 140B, and 140C are different from each other is described, but the extension directions are not limited thereto. The extension directions of all the awning portions 140, 140B, and 140C may be the same.

Moreover, in the third embodiment, the configuration in which the extension directions of the awning portions 140 covering the adjacent pores 31 are different from each other is described, but the extension directions are not limited to such an aspect. The extension directions of a plurality of the awning portions 140 covering the adjacent pores 31 may be the same.

In the third embodiment, the configuration in which the plurality of the pores 31 are formed in the first barrier 28 at intervals in the flow path direction of the main body flow path 25 is described, but the pores 31 are not limited to such an aspect. One pore 31 may be formed in the first barrier 28 or the second barrier 29.

In the third embodiment, the configuration in which the awning portion 140 is formed at the opening circumferential edge portion of at least the pore 31 located farthest from the second communication portion 27 along the flow path direction, among the plurality of pores 31, is described, but the awning portion 140 is not limited to such an aspect. The awning portion 140 may be formed only at the opening circumferential edge portion of the pore 31 which is located farthest from the first communication portion 26 along the flow path direction.

Furthermore, in the embodiment, the pores 31 are formed in the first barrier 28, but may be formed in the second barrier 29 or may be formed in both the first barrier 28 and the second barrier 29.

Moreover, in the embodiment, the pore 31 is formed in cylindrical shape (straight circular hole shape), but may be formed in a truncated cone shape which gradually decreases in diameter.

Moreover, in the embodiment, the plurality of pores 31 are formed in a circular shape in a transversal sectional view, but the present invention is not limited thereto. For example, an appropriate change can be made, for example, by forming the plurality of pores 31 in an angular shape in the transversal sectional view.

In the embodiment, although the first communication portion 26 includes the plurality of pores 31, but for example, may have a configuration having both openings with a larger diameter than the pores 31 and the pores 31. In addition, the second communication portion 27 may include a plurality of openings 32 arranged along the circumferential direction (the flow path direction of the main body flow path 25).

In the embodiment, the partition member 16 is disposed at the lower end portion of the first mounting member 11, and the outer circumferential portion 22 of the partition member 16 is caused to abut the lower end opening edge of the first mounting member 11. However, for example, by disposing the partition member 16 sufficiently above the lower end opening edge of the first mounting member 11, and disposing the diaphragm below the partition member 16, that is, at the lower end portion of the first mounting member 11, the auxiliary liquid chamber 15 may be formed over a range from the lower end portion of the first mounting member 11 to the bottom surface of the diaphragm 20.

In the embodiment, the compression type vibration dampening device 10 in which a positive pressure acts on the main liquid chamber 14 due to the application of a support load is described. However, the embodiment is also applicable to a suspension type vibration dampening device in which the main liquid chamber 14 is located on the lower side in the vertical direction, the auxiliary liquid chamber 15 is mounted so as to be located on the upper side in the vertical direction, and a negative pressure is applied to the main liquid chamber 14 as a support load is applied.

In the embodiment, the partition member 16 partitions the liquid chamber 19 in the first mounting member 11 into the main liquid chamber 14 having the elastic body 13 in a portion of the wall surface and the auxiliary liquid chamber 15, but is not limited thereto. For example, instead of providing the diaphragm 20, a pair of elastic bodies 13 may be provided, and instead of providing the auxiliary liquid chamber 15, a pressure receiving liquid chamber having the elastic body 13 in a portion of the wall surface may be provided. For example, a change to another configuration in which the partition member 16 partitions the liquid chamber 19 in the first mounting member 11 in which the liquid L is sealed into the first liquid chamber 14 and the second liquid chamber 15, and at least one of the first liquid chamber 14 and the second liquid chamber 15 has elastic body 13 in a portion of the wall surface is possible as appropriate.

Furthermore, the vibration dampening devices 10 and 110 according to the present invention are not limited to the engine mount of a vehicle, and may be applied to one other than the engine mount. For example, application to a mount of a generator mounted in a construction machine is possible, or application to a mount of a machine installed in a factory or the like is possible.

Furthermore, substitutions of the constituent elements of the embodiment with known constituent elements without departing from the spirit of the present invention are possible as appropriate, and the embodiments and the modification examples described above may be combined as appropriate.

INDUSTRIAL APPLICABILITY

According to the vibration dampening device described above, it is possible to suppress the generation of abnormal sound caused by cavitation collapse without reducing vibration dampening characteristics with a simple structure.

REFERENCE SIGNS LIST 10, 110 vibration dampening device
11 first mounting member
12 second mounting member
13 elastic body
14 main liquid chamber (first liquid chamber)
15 auxiliary liquid chamber (second liquid chamber)
16 partition member
19 liquid chamber
24 restriction passage
25 main body flow path
26 first communication portion
27 second communication portion
28 first barrier
28a surface
29 second barrier
31 pore
40, 40B protrusion
40a top portion
140, 140B, 140C awning portion (protrusion)
141 base end portion
142 open end portion

The invention claimed is:

1. A liquid-sealed type vibration dampening device comprising:
   a cylindrical first mounting member connected to any one of a vibration generating portion and a vibration receiving portion, and a second mounting member connected to the other;
   an elastic body elastically connecting both the mounting members to each other; and
   a partition member that partitions a liquid chamber in the first mounting member in which a liquid is sealed into a first liquid chamber and a second liquid chamber,
   wherein a restriction passage that causes the first liquid chamber and the second liquid chamber to communicate with each other is formed in the partition member,
   the restriction passage includes a first communication portion that is open to the first liquid chamber, a second communication portion that is open to the second liquid chamber, and a main body flow path that causes the first communication portion and the second communication portion to communicate with each other,
   at least one of the first communication portion and the second communication portion includes a plurality of pores penetrating a barrier having a surface facing the first liquid chamber or the second liquid chamber,
   a protrusion which protrudes toward the first liquid chamber or the second liquid chamber is formed at an opening circumferential edge portion of at least one pore among the plurality of pores in the surface of the barrier, and
   a top portion of the protrusion is formed in an acute angle shape or a curved surface shape which gradually decreases in thickness in a hole radial direction orthogonal to a hole axial direction in a longitudinal sectional view toward an outside of the pore along the hole axial direction along a central axis of the pore.

2. The vibration dampening device according to claim 1, wherein an inner circumferential surface of the protrusion has a shape similar to an inner circumferential surface of the pore in a plan view of the barrier.

3. The vibration dampening device according to claim 2, wherein the protrusion is formed over an entire circumference of the opening circumferential edge portion of the pore in the surface of the barrier.

4. The vibration dampening device according to claim 3, wherein the plurality of pores are formed in the barrier at intervals in a flow path direction of the main body flow path, and
   the protrusion is formed at the opening circumferential edge portion of at least one pore which is located farthest from the other of the first communication portion and the second communication portion along the flow path direction, among the plurality of pores, in the surface of the barrier.

5. The vibration dampening device according to claim 2, wherein the plurality of pores are formed in the barrier at intervals in a flow path direction of the main body flow path, and
   the protrusion is formed at the opening circumferential edge portion of at least one pore which is located farthest from the other of the first communication portion and the second communication portion along the flow path direction, among the plurality of pores, in the surface of the barrier.

6. The vibration dampening device according to claim 1, wherein the protrusion is formed over an entire circumference of the opening circumferential edge portion of the pore in the surface of the barrier.

7. The vibration dampening device according to claim 6, wherein the plurality of pores are formed in the barrier at intervals in a flow path direction of the main body flow path, and
   the protrusion is formed at the opening circumferential edge portion of at least one pore which is located farthest from the other of the first communication portion and the second communication portion along the flow path direction, among the plurality of pores, in the surface of the barrier.

8. The vibration dampening device according to claim 1, wherein the plurality of pores are formed in the barrier at intervals in a flow path direction of the main body flow path, and
   the protrusion is formed at the opening circumferential edge portion of at least one pore which is located farthest from the other of the first communication portion and the second communication portion along the flow path direction, among the plurality of pores, in the surface of the barrier.

9. A liquid-sealed type vibration dampening device comprising:
   a cylindrical first mounting member connected to any one of a vibration generating portion and a vibration receiving portion, and a second mounting member connected to the other;
   an elastic body elastically connecting both the mounting members to each other; and a partition member that partitions a liquid chamber in the first mounting member in which a liquid is sealed into a first liquid chamber and a second liquid chamber, wherein a restriction passage that causes the first liquid chamber and the second liquid chamber to communicate with each other is formed in the partition member, the restriction passage includes a first communication portion that is open to the first liquid chamber, a second communication portion that is open to the second liquid chamber, and a main body flow path that causes the first communication portion and the second communication portion to communicate with each other, at least one of the first communication portion and the second communication portion includes a plurality of pores penetrating a barrier having a surface facing the first liquid chamber or the second liquid chamber, a protrusion which protrudes toward the first liquid chamber or the second liquid chamber is formed at an opening circumferential edge portion of at least one pore among the plurality of pores in the surface of the barrier, and the protrusion is an awning portion formed to cover the pore.

10. The vibration dampening device according to claim 9, wherein the plurality of pores are formed in the barrier at intervals in a flow path direction of the main body flow path, and the protrusion is formed at the opening circumferential edge portion of at least one pore which is located farthest from the other of the first communication portion and the second communication portion along the flow path direction, among the plurality of pores, in the surface of the barrier.

11. The vibration dampening device according to claim 9, wherein the awning portion has a base end portion connected to the barrier, and two or more of a plurality of the awning portions are arranged to be different from each other in a direction from a central portion in a hole circumferential direction around a central axis of the pore at the base end portion of the awning portion to a central portion in the hole circumferential direction at an open end portion of the awning portion in a plan view of the barrier.

12. The vibration dampening device according to claim 11, wherein the awning portions covering the pores adjacent to each other are arranged to be different from each other in the direction from the central portion in the hole circumferential direction at the base end portion of the awning portion to the central portion in the hole circumferential direction at the open end portion of the awning portion in the plan view.

13. The vibration dampening device according to claim 9, wherein an inner circumferential surface of the protrusion has a shape similar to an inner circumferential surface of the pore in a plan view of the barrier.

14. The vibration dampening device according to claim 9, wherein the protrusion is formed over an entire circumference of the opening circumferential edge portion of the pore in the surface of the barrier.

\* \* \* \* \*